(12) United States Patent
Rivera (10) Patent No.: US 10,111,553 B2
(45) Date of Patent: Oct. 30, 2018

(54) PACKAGE ASSEMBLY FOR FORMING BEVERAGE PODS

(76) Inventor: Adrian Rivera, Las Vegas, NV (US)

( * ) Notice: Subject to any disclaimer, the term of this patent is extended or adjusted under 35 U.S.C. 154(b) by 1356 days.

(21) Appl. No.: 11/392,893

(22) Filed: Mar. 28, 2006

(65) Prior Publication Data

US 2007/0144356 A1 Jun. 28, 2007

Related U.S. Application Data

(60) Provisional application No. 60/594,972, filed on May 23, 2005.

(51) Int. Cl.
*A47J 31/06* (2006.01)
*A47J 31/08* (2006.01)
*A47J 31/44* (2006.01)
*B65B 29/02* (2006.01)
*B65B 67/02* (2006.01)

(52) U.S. Cl.
CPC ............. *A47J 31/08* (2013.01); *A47J 31/44* (2013.01); *B65B 29/02* (2013.01); *B65B 67/02* (2013.01)

(58) Field of Classification Search
CPC A47J 31/08; A47J 31/085; A47J 31/10; A47J 31/103; A47J 31/106; A47J 31/12; A47J 31/18; A47J 31/20; A47J 31/24; A47J 31/30; A47J 31/44; A47J 31/4403; A47J 31/4407; B65B 29/02; B65B 29/025; B65B 29/028; B65B 29/04; B65B 29/08; B65B 29/06; B65B 67/02
USPC ......... 99/295, 323; 426/184, 111–2, 394, 77
See application file for complete search history.

(56) References Cited

U.S. PATENT DOCUMENTS

| 4,800,089 | A | * | 1/1989 | Scott | 426/78 |
| 5,012,629 | A | * | 5/1991 | Rehman et al. | 53/453 |
| 5,171,457 | A | * | 12/1992 | Acuff et al. | 210/800 |
| 5,895,672 | A | * | 4/1999 | Cooper | 426/79 |
| 6,740,345 | B2 | | 5/2004 | Cai | |
| 6,777,007 | B2 | | 8/2004 | Cai | |
| 2004/0005384 | A1 | * | 1/2004 | Cai | 426/77 |

* cited by examiner

*Primary Examiner* — Shawntina Fuqua
(74) *Attorney, Agent, or Firm* — IP Strategies (57) ABSTRACT

A compact and lightweight personal pod making system is provided. The pod making system has a base for receiving a pod packaging material and a sealing tool pivotably connected to the base. The system can be used at home, in the office and even outdoors. A pod package assembly that can be used in conjunction with the personal pod making system is also provided. The pod package assembly can include a cup-like holder that is hingedly connected to a cover so that it is relatively easy for users to align the cover when sealing the pod.

26 Claims, 6 Drawing Sheets

PACKAGE ASSEMBLY FOR FORMING BEVERAGE PODS

CROSS-REFERENCE TO RELATED APPLICATIONS

This application claims the benefit of priority under 35 U.S.C. § 119(e) of U.S. Provisional Application No. 60/594,972 filed on May 23, 2005 and entitled FILTER MACHINE, the entirety of which is incorporated herein by reference.

BACKGROUND OF THE INVENTION

Field of the Invention

This invention generally relates to systems and methods for forming pre-packaged brewing material such as coffee or tea pods, and in particular, relates to a lightweight and compact system for individual personal use in making coffee and/or tea pods.

Description of the Related Art

Beverage pods generally refer to coffee or tea that is pre-packaged and sealed inside a filter material. The pods are typically configured to be placed in a specially designed brewing machine in which hot water is filtered through the pod to make the beverage. In recent years, pod-based brewing systems have gained popularity as they are convenient to use and require very little cleaning up. Coffee pods, for example, typically contain a pre-measured amount of coffee sealed inside a disc-shaped package formed by filter papers and can be conveniently removed and disposed of when the brewing is finished.

However, one drawback associated with using a pod-based brewing system is that the choice of coffee in pod form is usually limited to the selections provided by pod manufacturers. Consequently, coffee drinkers are generally limited to the types of coffee sold in pod form that are available in the stores. Additionally, coffee connoisseurs often prefer grinding the coffee right before it is brewed in order to preserve its flavor. Pre-packaged coffee pods sold in the stores could be viewed as not as fresh by some coffee drinkers who prefer freshly ground coffee.

In view of the foregoing, it will be appreciated that there is a need for individual consumers to have more choices in the types of coffee or other beverage that can be made using pod-based brewing systems. To this end, there is a particular need for a device and method that would allow individuals to easily and conveniently form custom pods containing brewing material of their choice.

SUMMARY OF THE INVENTION

As used herein, the term "pod" is a broad term and shall have its ordinary meaning and shall include, but not be limited to, a package formed of a water permeable material and containing an amount of ground coffee or other beverage therein.

The preferred embodiments of the personal pod making system have several features, no single one of which is solely responsible for their desirable attributes. Without limiting the scope of this invention, its more prominent features will now be discussed briefly. However, not all of the following features are necessary to achieve the advantages of the system. Therefore, none of the following features should be viewed as limiting. After considering this discussion, and particularly after reading the section entitled "Detailed Description of the Preferred Embodiments," one will understand how the features of the preferred embodiments provide advantages over prior art systems.

One such advantage is the lightweight and portability of the system. The system is designed for personal use and is simple to operate and maintain. Another advantage is the incorporation of a novel pod package assembly that facilitates alignment and sealing of the pod which requires substantially less user adjustment and manipulation as compared to conventional pod package material.

In one aspect, the invention provides a compact and lightweight pod making system. The system comprises a base and a sealing tool that is pivotably coupled to the base. The base has a receptacle that is adapted to receive at least a portion of a pod packaging material, wherein the pod packaging material has a lower portion and an upper portion. The sealing tool has a heat sealing surface that is adapted to contact the upper portion of the pod packaging material and apply heat thereto when the lower portion of the pod packaging material is positioned in the receptacle of the base and when the sealing tool is pivoted toward the base. Preferably, the receptacle has an inner diameter of between about 30 mm to 80 mm, and a depth of between about 1 mm to 15 mm. In one implementation, the heat sealing surface is substantially circular and has a diameter of about 75 mm. In some implementations, the system further includes a receptacle size adjuster which is configured to reduce the diameter of the receptacle. The system can be powered by battery or an external power source. In one embodiment, the base of the system comprises a support tray having one or more receptacles. In another embodiment, the pod making system has an alignment system adapted to facilitate alignment of the receptacles with the sealing tool. Preferably, the pod making system is portable and weighs less than 25 pounds, in some implementations preferably less than 15 pounds.

In another aspect, the preferred embodiments of the present invention provide a packaging material for forming beverage pods. The packaging material comprises a receptacle having a base and a sidewall extending upwardly from the base, wherein the receptacle has an upper opening defined by an upper portion of the sidewall. The packaging material further comprises a cover that is hingedly attached to the receptacle, wherein the cover is configured to cover the upper opening of the receptacle. Preferably, the receptacle and the cover are made of water permeable material.

In yet another aspect, the preferred embodiments of the present invention provide a pod package assembly. The assembly comprises a lower portion, which is configured to receive and hold an amount of ground coffee, and an upper portion which is coupled to the lower portion in a manner such that the upper portion is pivotable relative to the lower portion. Preferably, the upper portion is adapted to enclose the ground coffee in the lower portion. In one embodiment, the lower portion is cup-shaped. In another embodiment, the lower portion has an annular rim which is adapted to form a seal with the upper portion. Preferably, the lower portion has a diameter of between about 30 mm to 80 mm.

In yet another aspect, the preferred embodiments of the present invention provide a method of manufacturing a package assembly for forming beverage pods. The method includes the steps of providing a lightweight and water permeable material and processing the material to form two substantially circular portions that are hingedly connected to each other, wherein one of the portions is configured to receive and hold a brewable material such as ground coffee. In one embodiment, processing the material comprises die cutting the material. In another embodiment, the method further comprises applying a heat activated adhesive to the periphery of the circular portions. In yet another embodiment, processing the material comprises forming two separate circular portions and connecting the two portions together using an adhesive.

DETAILED DESCRIPTION OF PREFERRED EMBODIMENTS

Figure 1:
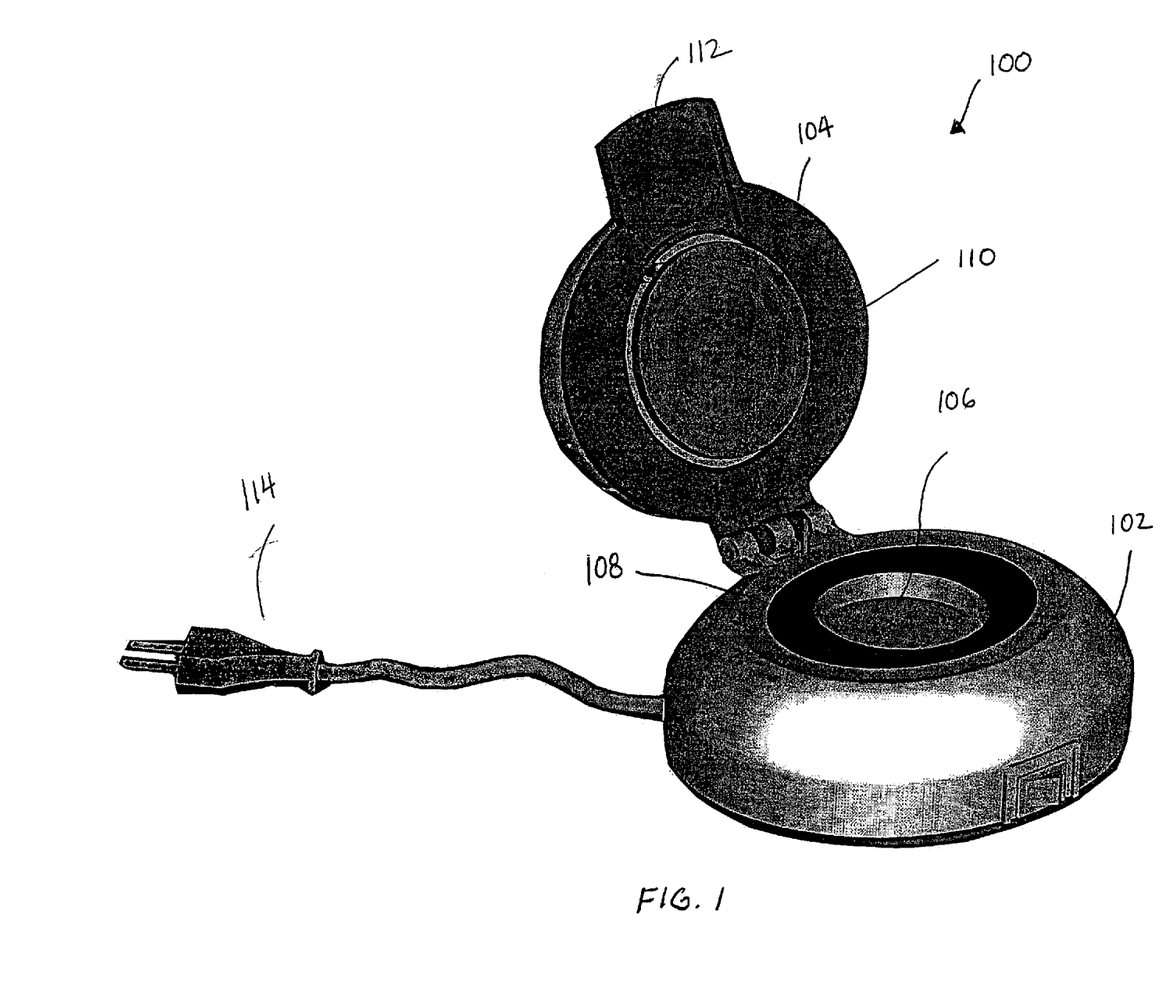
FIG. 1 is a schematic illustration of a lightweight and portable personal coffee pod making system of one preferred embodiment the present invention.

One embodiment of a lightweight and portable personal pod making system 100 having features and advantages in accordance with the present invention is illustrated in FIG. 1. While the embodiment describes a system designed for making pods containing ground coffee, it will be appreciated that the concept can be applied to forming other types of pre-packaged brewing material such as tea or other beverage pods.

As shown in FIG. 1, the personal pod making system 100 generally comprises a base 102 for supporting a pod package material and a sealing tool 104 that is pivotably coupled to the base 102. In one embodiment, the base 102 has a receptacle 106 configured to receive a sealable pod packaging material such as conventional disc-shaped filter papers used for forming coffee pods. In one implementation, the receptacle 106 has a circular cross-section with an inner diameter of between about 30 mm to 80 mm and a depth of between about 1 mm to 15 mm. However, it will be understood that the inner diameter and depth of the receptacle 106 can vary to correspond to the dimensions of various filter papers or the like that are suitable for use as pod packaging material. It will also be understood that the receptacle 106 can also be designed with various other cross-sectional shapes such as square, triangular, or oval. As will be described in greater detail below, the receptacle 106 is preferably configured so that a disc-shaped pod package material such as filter paper can be seated snugly in the receptacle with the rim portions of the pod package material extending outwardly from the receptacle and disposed around the periphery of the receptacle.

In certain preferred embodiments, the system 100 further includes a receptacle size adjuster 108, preferably in the form of an annular ring as shown in FIG. 1. The receptacle size adjuster 108 is removable and can be placed in the receptacle to adjust the inner diameter of the receptacle so as to accommodate for pod packaging materials of various sizes. The receptacle size adjuster 108 can be made of various materials including silicone, rubber, and/or metal. In one embodiment, the receptacle size adjuster 108 has a width of about 50 mm is configured to reduce the diameter of the receptacle 106 from 80 mm to about 30 mm.

As also illustrated in the system 100 shown in FIG. 1, the sealing tool 104 has a generally annular sealing surface 110 and a handle 112 extending therefrom. The handle 112 is designed to facilitate the user in pivoting the sealing tool 104 relative to the base 102 and pressing the heated sealing surface 110 against the pod package material to seal the pod. In one embodiment, the sealing surface 110 is arranged in a circular pattern and has a diameter of about 75 mm. Heating elements and the like can be positioned under the sealing surface 110 to provide a source of heat. As will be described in greater detail below, in operation, the sealing tool 104 can be manually or automatically extended downwardly so that the sealing surface 110 engages with the base 102 in a manner such that the heated sealing surface 110 presses against the periphery or annular rim of a pod packaging material and seal the pod in a manner to be described in greater detail below. In one embodiment, the sealing tool 104 can be electrically heated to a temperature ranging between about 130° F. to 250° F. In a preferred embodiment, the personal pod making system 100 is generally made of a lightweight material such as plastics so that it is portable and weighs less than about 25 lbs, preferably less than 20 lbs, preferably less than 15 lbs, more preferably less than 10 lbs. The system 100 can be powered by an external source via an electrical plug 114 or by batteries installed in the system.

Figure 2A:
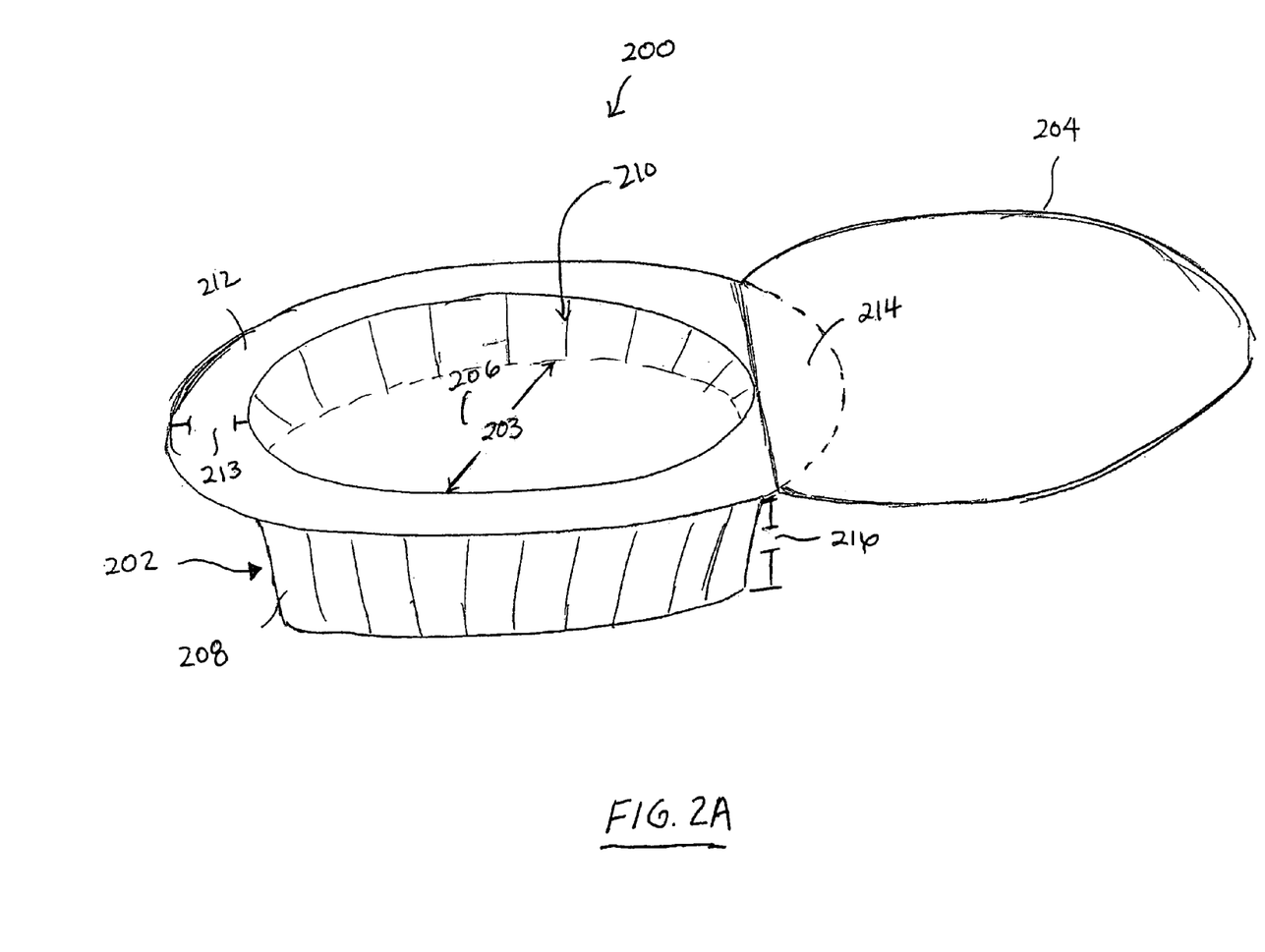
FIGS. 2A-2C illustrate embodiments of a pod packaging assembly that can be used in conjunction with the system of FIG. 1.
Figure 2B:
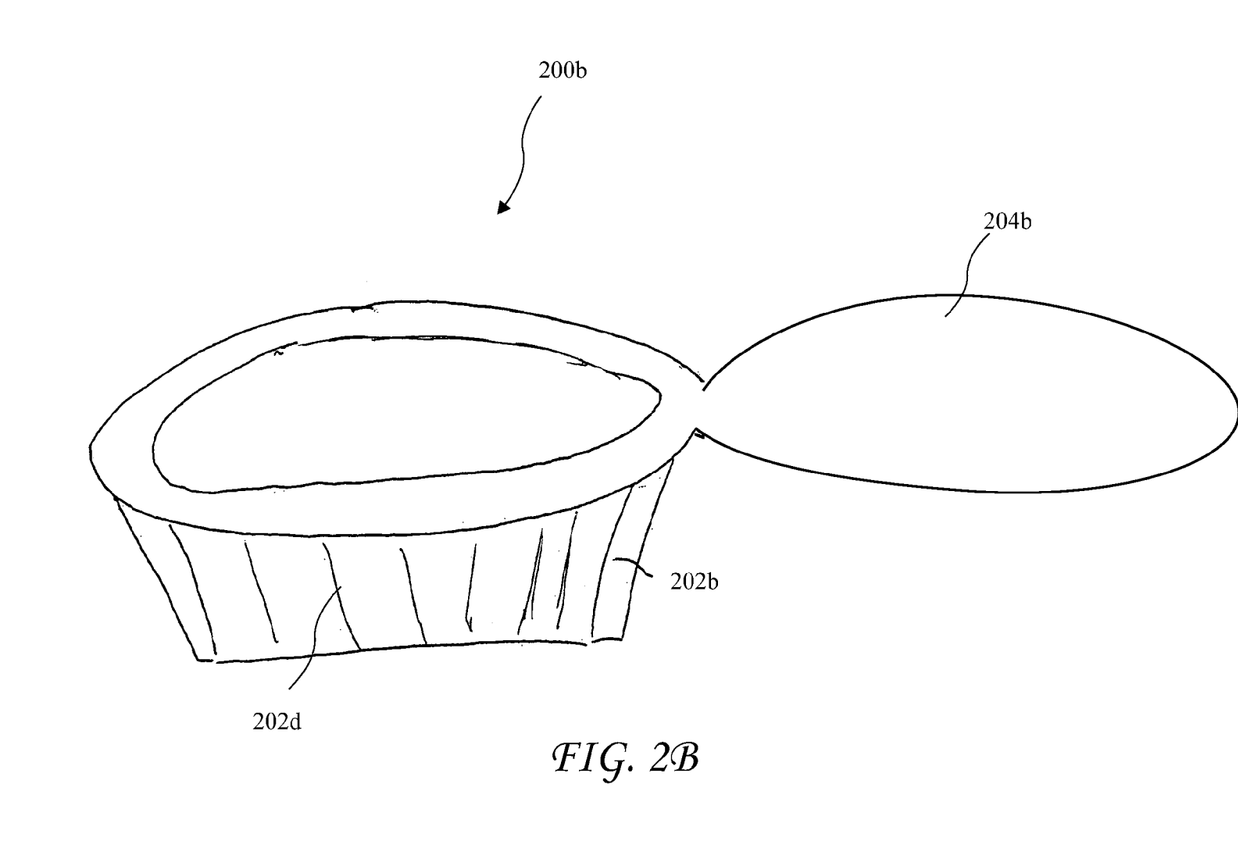
Figure 2C:
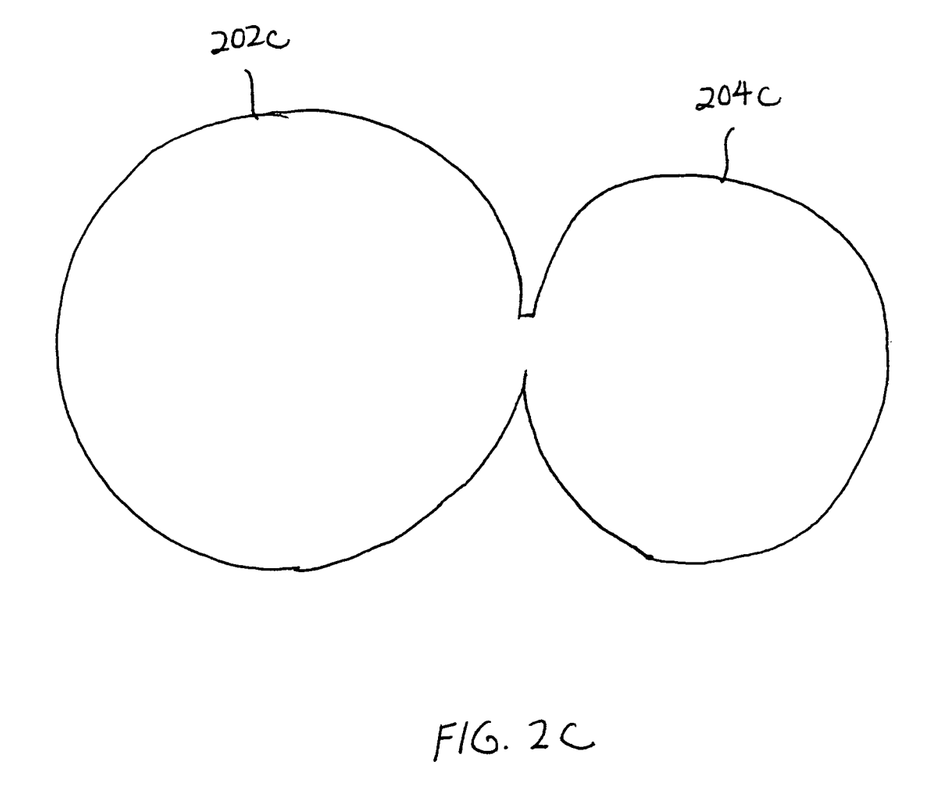

FIGS. 2A-2C illustrate preferred embodiments of a novel pod package assembly 200 that can be used in conjunction with the pod making system 100 of FIG. 1. As shown in FIG. 2A, the pod package assembly 200 comprises a cup-shaped holder 202 configured to receive a measured amount of ground coffee and a hinged cover 204 configured to enclose the ground coffee in the holder 202. Preferably, the holder 202 has a circular base 206 and a substantially vertical sidewall 208 extending upwardly from the base 206 to define an upper opening 210. In one embodiment, the holder 202 has an inner diameter 203 of between about 30 mm to 80 mm and the sidewall 208 of the holder has a height 216 of about 1 mm to 15 mm. The holder 202 farther comprises an annular rim 212 extending from the upper opening 210. In one embodiment, the annular rim 212 has a width 213 of between about 2 mm to 6 mm. The hinged cover 204 is coupled to the annular rim 212 and preferably has a diameter of between 60 mm to 80 mm. Preferably, the holder 202 and the hinged cover 204 are pivotably connected at a joint area 214. In one embodiment, the joint area 214 is disposed along a portion of the annular rim 212 of the holder. Preferably, the joint area 214 comprises about 5 percent of the circumference of the cover, more preferably about 10 percent, more preferably about 15 percent, more preferably about 25 percent.

In a preferred embodiment, the holder 202 and the cover 204 of the pod package assembly 200 are made of a water permeable material such as filter paper. In certain preferred implementations, the sidewall 208 of the holder 202 has one or more folds 202d therein or is corrugated so as to lend strength and rigidity to the structure of the holder 202 and defines a frusto-conical surface. However, it will be appreciated that the sidewall could also have a substantially smooth surface. Preferably, a heat activated adhesive is applied to the periphery of cover 204 and/or the annular rim 212 of the holder so that the periphery of the cover can be joined with the annular rim of the holder to form a seal between the cover and the holder.

The pod package assembly 200 having the hinged cover 204 as described above advantageously facilitates alignment of the cover 204 to the holder 206. Instead of trying to carefully position the cover so that the periphery of the cover overlaps the annular rim, a user simply has to flip the cover over as the periphery of the cover would be automatically aligned with the annular rim of the holder. In one embodiment, the holder 202 is pre-attached to the cover 204 at the joint area 214 using an adhesive or bonding agent. Alternatively, as shown in FIG. 2B, the holder 202b and the cover 204b can be integrally formed and flat. In one embodiment, the pod package assembly 200 can comprise a one-piece material such as filter paper that is die cut into the hinged configuration as shown in FIG. 2B. In yet another embodiment, the pod package assembly 200 comprises two circular portions 202c, 204c hingedly connected together as shown in FIG. 2C. Preferably, the first portion 202c comprises a circular piece of filter paper 202c which is capable of serving as a supporting surface for ground coffee. Preferably, the second portion 204c comprises a circular piece of filter paper 204c which is capable of serving as a cover that can be used to enclose the coffee. Preferably, the diameter of the first portion 202c is smaller than the diameter of the second portion 204c. While the preferred embodiments illustrate the pod package assembly as comprising a holder that is hingedly connected to a cover, various other forms of pod package assemblies including those in which the holder and the cover are not connected are also contemplated to be within the scope of the invention.

Figure 3:
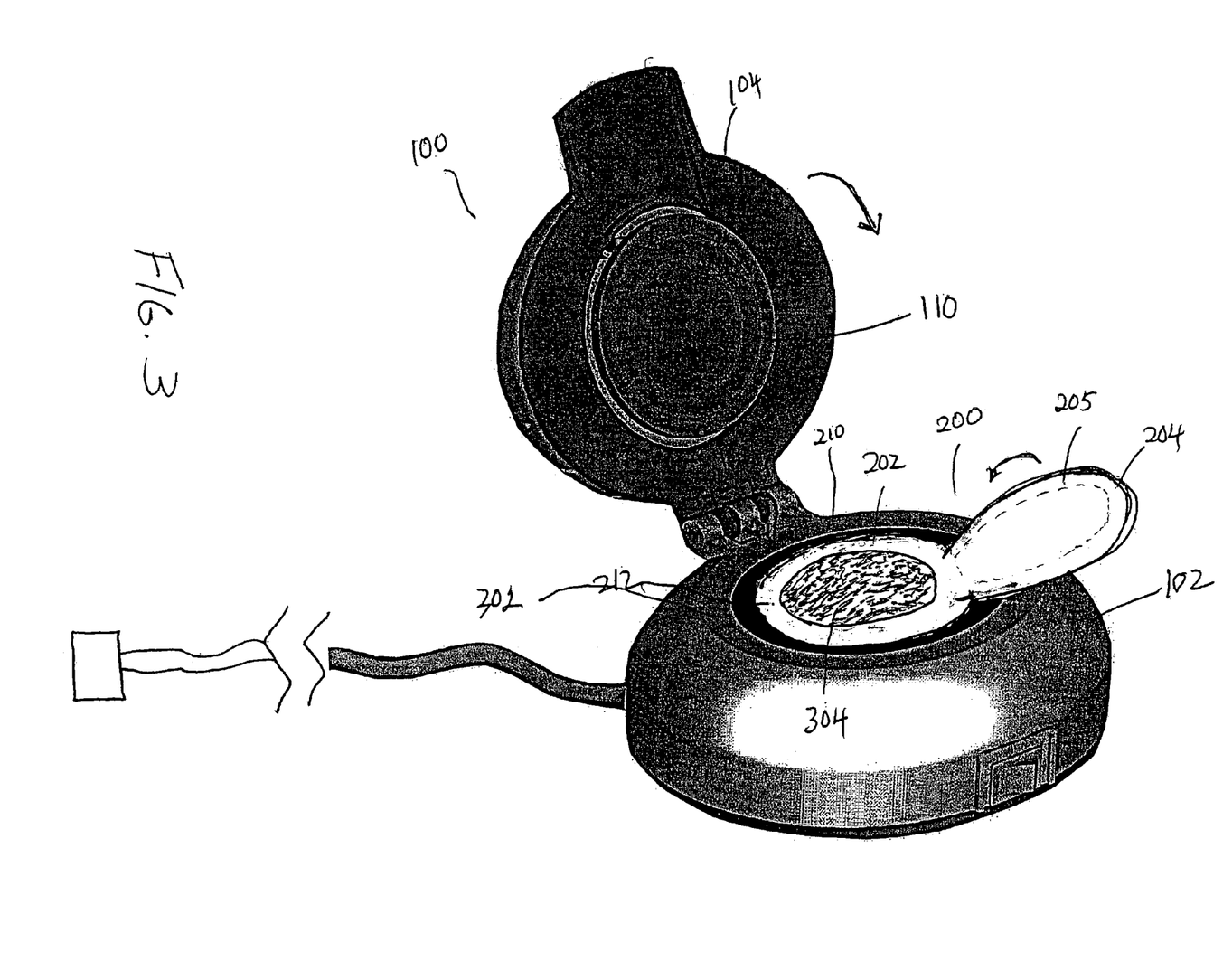
FIG. 3 illustrates the manner in which a coffee pod can be formed using the system of FIG. 1.

FIG. 3 schematically illustrates the manner the pod making system 100 of FIG. 1 can be used to form coffee or tea pods. As shown in FIG. 3, a pod package assembly 200 described above in FIG. 2A is placed in the receptacle of the pod making system 100 in a manner such that the cup-shaped holder 202 is seated in the receptacle and the annular rim 212 is disposed adjacent an upper surface 302 of the base 102. An amount of ground coffee 304 or other brewable beverage is placed in the holder 202. Subsequently, the cover 204 can be simply flipped over to cover the upper opening 210 of the holder 202. Since the cover 204 is hingedly connected to the holder 202, the periphery 205 of the cover 204 will align with the annular rim 212 of the holder 202 without requiring much user manipulation. The sealing tool 104 is then pivoted toward the base 102 so that the heating surface 110 of the sealing tool 104 contacts the pod cover 204. When the heated sealing surface contacts the pod cover which can be made of a sealable filter paper, the heat activates the adhesive on the annular rim of the cup-shaped holder 202 and/or the periphery 205 of the cover 204 to bond the cover to the holder so as to seal the pod. Additionally, while being pressed down on the base, force exerted on the sealing tool 104 also serves to compress the ground coffee inside the pod package assembly.

Figure 4:
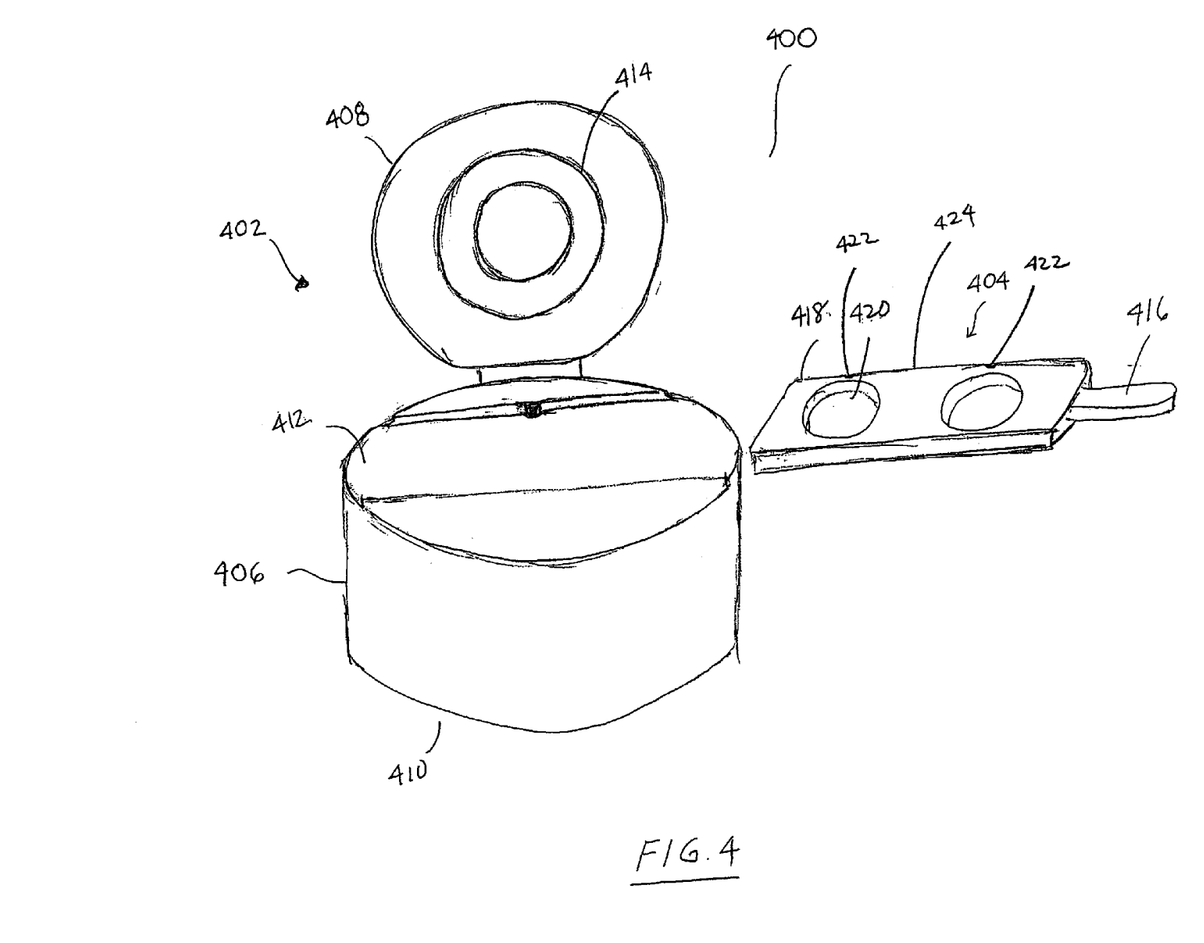
FIG. 4 is a schematic illustration of another embodiment of the pod making system of the present invention.

FIG. 4 shows another embodiment of the pod making system 400, which generally includes a compact and lightweight sealing assembly 402 and a receptacle 404 configured to receive sealable packaging material such as filter papers designed for forming pods. In one embodiment, the sealing assembly 402 comprises a base 406 and a heat sealer 408 pivotably coupled thereto. Preferably, the base 406 has a generally flat lower surface 410 configured to rest against a support surface such as a table top and a slotted upper surface 412 configured to slidably engage with the support tray 404 in a manner to be described in greater detail below. As also shown in FIG. 4, the heat sealer 408 has a plurality of heating elements 414. In a preferred embodiment, the heating elements 414 are arranged in a circular pattern and are dimensioned to generally correspond to the diameter of the packaging material. As will be described in greater detail below, each heat seal element 414 is configured to contact the periphery of a particular sized circular sealable packaging material to bond the material at selected areas along the periphery. The circular heat seal elements 114 are adapted to bond circular pod package materials such as filter papers having diameters of 30 mm and 80 mm. The sealing assembly 402 can be powered by an external power source or can be powered by internal batteries.

As also illustrated in FIG. 4, the support tray 404 generally comprises a handle 416, a rectangular body 418 and a plurality of receptacles 420 formed therein. Preferably, the support tray 404 is configured to slidable engage with the slotted upper surface 412 of the sealing assembly 402. In one embodiment, a plurality of alignment slots 422 are formed along one edge 424 of the support tray 404. The alignment slots 422 are configured to couple with similar alignment slots formed along the slotted upper surface 412 of the sealing assembly 402. The alignment slot adjacent a receptacle is aligned with the alignment slot on the sealing assembly 402 to ensure that the packaging material in the receptacle is in alignment with the heat seal element 414. Preferably, the depth of each receptacle is such that a circular filter paper is received in the receptacle and a portion of the periphery of the filter paper is above the receptacle. In one embodiment, the support tray 404 has a width of about 70 mm, a length of about 210 mm and a thickness of about 18 mm. In another embodiment, the receptacles 420 in the support tray 404 are circular and has a diameter of about 50 mm and a depth of about 1 mm to 15 mm. In one embodiment, the tray is preferably coated with a non-sticking material such as Teflon. This particular embodiment of the pod making system allows users to make pods containing different types of ground coffee or beverage all in one sitting.

The personal pod making system of the preferred embodiments of the present invention provides a compact and lightweight custom pod making system suitable for individual use. The system is portable and thus allows users to make custom beverage pods at home, in the office, or even outdoors. Additionally, the preferred embodiments of the present invention also provide a novel pod packaging system which is designed to facilitate alignment of the pod cover to the cup-shaped holder so as to reduce user handling and manipulation.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A method of manufacturing a package assembly and forming a beverage pod, comprising:
   forming a package assembly comprising the steps of:
      providing water permeable material;
      forming substantially circular lower and upper portions hingedly connected to each other, from the water permeable material;
      shaping the lower portion to form a downward concave cup shape to receive and hold a brewing material;
      forming an annular rim surrounding the concave cup shape of the lower portion, therein the upper portion is configured to fold along the hinge over the lower portion and onto the annular rim to seal with the lower portion to form a single pod;
   providing the package assembly to an individual user;
   manufacturing a single beverage pod by the user, comprising the steps of:

positioning a pod making apparatus on a support surface;
positioning the lower portion of the package assembly in a receptacle of a base of the pod making apparatus;
filling the concave cup shape of the lower portion of the package assembly with the brewing material;
folding the upper portion of the package assembly over the lower portion;
heating a heat sealing surface of a hinged sealing tool of the pod making apparatus;
pivoting the hinged sealing tool over the base of the pod making apparatus to sandwich the upper portion of the annular rim of the lower portion of the pod packaging material between the heat sealing surface and the base; and
heat sealing the upper portion to the lower portion to form a single beverage pod.

2. The method of claim 1, wherein:
providing the water permeable material comprises providing a single piece of the water permeable material; and
forming substantially circular lower and upper portions comprises forming substantially circular lower and upper portions hingedly connected to each other from the single piece of the water permeable material.

3. The method of claim 1, wherein forming substantially circular lower and upper portions comprises forming two separate circular portions and connecting the two portions together using an adhesive.

4. The method of claim 1, wherein forming substantially circular lower and upper portions includes first creating an unformed lower portion having a larger diameter than the upper portion.

5. The method of claim 1, wherein forming annular rim comprises forming a generally horizontal annular rim.

6. A method for forming a beverage pod, comprising;
obtaining a package assembly by an individual, user, the package assembly comprising:
water permeable material;
substantially circular lower and upper portions, and a hinge portion connecting the lower and upper portions, all formed from the water permeable material;
the lower portion shaped to form a downward concave cup shape to receive and hold a single serving of, a brewing material and including a radially outward reaching flat annular rim formed to surround a top edge of the concave cup shape of the lower portion;
the upper portion comprising a flat cover, wherein the upper portion is configured to fold along the hinge portion over the lower portion and onto the annular rim to seal with the lower portion to form a single serving beverage pod;
preparing a single of brewed beverage by the user, comprising:
positioning the lower portion of the package assembly to from a receptacle for the single serving of brewing material;
filling the concave cup shape of the lower portion of the package assembly with the single serving of brewing material;
folding the upper portion of the package assembly over the lower portion and onto the rim of the lower portion to form a beverage pod;
positioning the beverage pod in a beverage maker; and
providing a flow of heated water through the beverage pod to produce a single serving of brewed beverage;
positioning a pod making apparatus on a support surface;
positioning the lower portion of the package assembly in a receptacle of a base of the pod making apparatus;
heating a heat sealing surface of the pod making apparatus;
sandwiching the upper portion and the annular rim of the lower portion of the pod packaging material between the heat sealing surface and the base; and
heat sealing the upper portion to the lower portion to form a single beverage pod.

7. The method of claim 6, wherein the upper portion and the lower portion are cut from a single continuous portion of the lightweight and water permeable material.

8. The method of claim 7, wherein the upper portion and the lower portion are connected by a continuous portion of the water permeable material.

9. The method of claim 6, wherein a heat activated adhesive resides on the periphery of at least one of the circular portions.

10. An empty container comprising:
water-permeable filter material including hingedly-connected first and second portions;
wherein, in an unformed state, the first and second portions are both flat, and a surface area of the second portion is greater than and can completely cover a surface area of the first portion;
wherein, in a formed state, the second portion is a receptacle configured to hold brewing material, wherein the receptacle includes
a concave cup having a bottom and sidewalls defining an interior of the concave cup, wherein the sidewalls include folds that enable transition between the unformed and formed states; and
an annular rim at least partially surrounding a top edge of the sidewalls of the concave cup;
wherein, in the formed state, the second portion is a flat lid configured to contact an upper surface of the annular rim and thereby cover and enclose the interior of the concave cup;
wherein the receptacle has a circular cross-section; and
wherein the concave cup has a diameter of between about 30 mm and about 50 mm.

11. The empty container of claim 10, wherein the filter mater is a single sheet of filter material.

12. The empty container of claim 10, wherein the annular rim substantially perpendicular to the top edge of the sidewalls.

13. The empty container of claim 10, wherein at least one of the lid and the upper surface of the annular rim has a heat-activated adhesive applied thereto.

14. The empty container of claim 10, wherein the lid is hingedly attached to the annular rim of the receptacle only by the filter material.

15. The empty container of claim 14, wherein the lid and the annular rim of the receptacle are attached only to each other.

16. The empty container of claim 10, wherein the lid is attached to a segment of the upper surface of the annular rim by adhesive disposed along the segment of the annular rim, such that the cover can be folded back to provide access to the interior of the concave cup.

17. An empty container, comprising:
water-permeable filter material including hingedly-connected first and second portions;
wherein, in an unformed state, the first and second portions are both flat, and a surface area of the second portion is greater than and can completely cover a surface area of the first portion;

wherein, in a formed state, the second portion is a receptacle configured to hold brewing material, wherein the receptacle includes a concave cup having a bottom and sidewalls defining an interior of the concave cup, wherein the sidewalls include folds that enable transition between the unformed and formed states; and an annular rim at least partially surrounding a top edge of the sidewalls of the concave cup;

wherein, in the formed state, the second portion is a flat lid configured to contact an upper surface of the annular rim and thereby cover and enclose the interior of the concave cup; and wherein the receptacle has a circular cross-section with a diameter of about 50 mm and a depth of between about 1 mm and about 15 mm.

18. The empty container of claim 10, wherein, in the unformed state, the first and second portions are both flat portions having generally circular cross-sections, wherein the second portion has a diameter that is larger than a diameter of the first portion.

19. The empty container of claim 17, wherein the filter material is a single sheet of filter material.

20. The empty container of claim 17, wherein the annular rim is substantially perpendicular to the top edge of the sidewalls.

21. The empty container of claim 17, wherein at least one of the lid and the upper surface of the annular rim has a heat-activated adhesive applied thereto.

22. The empty container of claim 17, wherein the concave cup has a diameter of between about 30 mm and about 50 mm.

23. The empty container of claim 17, wherein the lid is hinged y attached to the annular rim of the receptacle only by the filter material.

24. The empty container of claim 23, wherein the lid and the annular of the receptacle are attached only to each other.

25. The empty container of claim 17, wherein the lid is attached to a segment the upper surface of the annular rim by adhesive disposed along the segment of the annular rim, such that the cover can be folded back to provide access to the interior of the concave cup.

26. The empty container of claim 17, wherein, in the unformed state, the first and second portions are both flat portions having generally circular cross-sections, wherein the second portion has a diameter that is larger than a diameter of the first portion.

* * * * *

UNITED STATES PATENT AND TRADEMARK OFFICE
CERTIFICATE OF CORRECTION

PATENT NO. : 10,111,553 B2
APPLICATION NO. : 11/392893
DATED : October 30, 2018
INVENTOR(S) : Adrian Rivera It is certified that error appears in the above-identified patent and that said Letters Patent is hereby corrected as shown below:

In the Claims

Beginning at Column 8, Line 19 Claim 17 should read:
17. An empty container, comprising:
    water-permeable filter material including hingedly-connected first and second portions;
    wherein, in an unformed state, the first and second portions are both flat, and a surface area of the second portion is greater than and can completely cover a surface area of the first portion;
    wherein, in a formed state, the second portion is a receptacle configured to hold brewing material, wherein the receptacle includes
        a concave cup having a bottom and sidewalls defining an interior of the concave cup, wherein the sidewalls include folds that enable transition between the unformed and formed states; and
        an annular rim at least partially surrounding a top edge of the sidewalls of the concave cup;
    wherein, in the formed state, the first portion is a flat lid configured to contact an upper surface of the annular rim and thereby cover and enclose the interior of the concave cup; and
    wherein the receptacle has a circular cross-section with a diameter of about 50 mm and a depth of between about 1 mm and about 15 mm.

Beginning at Column 10, Line 9 Claim 23 should read:
23. The empty container of claim 17, wherein the lid is hingedly attached to the annular rim of the receptacle only by the filter material.

Signed and Sealed this
Tenth Day of January, 2023

*Katherine Kelly Vidal*

Katherine Kelly Vidal
*Director of the United States Patent and Trademark Office*